(12) United States Patent
Lin et al.

(10) Patent No.: US 7,884,151 B2
(45) Date of Patent: Feb. 8, 2011

(54) MATERIAL OF NANOCOMPOSITES OF THE RESIN AND ITS MANUFACTURING PROCESS

(75) Inventors: Jiang-Jen Lin, Taipei (TW); Chih-Wei Chiu, Taipei (TW); Ing-Nan Jan, Taipei (TW)

(73) Assignee: CPC Corporation, Taiwan, Taipei (TW)

( * ) Notice: Subject to any disclaimer, the term of this patent is extended or adjusted under 35 U.S.C. 154(b) by 83 days.

(21) Appl. No.: 12/188,399

(22) Filed: Aug. 8, 2008

(65) Prior Publication Data

US 2009/0318603 A1    Dec. 24, 2009

(30) Foreign Application Priority Data

Jun. 18, 2008    (TW) .............................. 97122627 A

(51) Int. Cl.
  *C08K 3/34*  (2006.01)
  *B82B 1/00*  (2006.01)
(52) U.S. Cl. ................ 524/445; 524/447; 524/446; 524/502; 524/755; 524/765; 977/700
(58) Field of Classification Search ................ 524/445, 524/447, 446, 502, 755, 765; 977/700
See application file for complete search history.

(56) References Cited

U.S. PATENT DOCUMENTS

| 6,762,233 | B2 * | 7/2004 | Chaiko ........................ 524/445 |
| 7,687,121 | B2 * | 3/2010 | Landon et al. ................. 428/34 |
| 2007/0149683 | A1 * | 6/2007 | Campbell et al. ........... 524/445 |
| 2007/0173598 | A1 * | 7/2007 | Williams et al. ............ 524/588 |
| 2008/0188587 | A1 * | 8/2008 | Avakian ..................... 523/122 |
| 2008/0287584 | A1 * | 11/2008 | Golba et al. ................. 524/413 |

* cited by examiner

*Primary Examiner*—Robert D. Harlan
(74) *Attorney, Agent, or Firm*—Alan Kamrath; Kamrath & Associates PA

(57) ABSTRACT

The manufacturing process of a material of nanocomposites of the resin includes providing a nano-clay platelets liquid; adding a modification agent into the nano-clay platelets liquid, then stirring in a first time in a first temperature for making a cake product; taking the cake product heated in a second temperature and then crumbling the cake product for making a first powder; moving the water out of the first powder for making a second powder; adding a resin into the second powder, then stirring and baking for making the material of nanocomposites of the resin.

22 Claims, 3 Drawing Sheets

| clay | SA102 (wt%) | MHHPA (wt%) | Epoxy resin (wt%) | NSP105/ NMP105 (wt%) | CTE ($\mu$m/m°C) (50-100 °C) | Hardness (H) | Translucence (%) |
|---|---|---|---|---|---|---|---|
| None | 1.0 | 55.1 | 44.9 | 0.0 | 82 | 4 | 85 |
| NSP | 1.0 | 54.5 | 44.4 | 1.1 | 78 | 4 | 84 |
| NSP | 1.0 | 53.3 | 43.5 | 3.2 | 65 | 5 | 80 |
| NSP | 1.0 | 52.2 | 42.6 | 5.2 | 37 | 7 | 72 |
| NMP | 1.0 | 54.5 | 44.4 | 1.1 | 71 | 4 | 84 |
| NMP | 1.0 | 53.3 | 43.5 | 3.2 | 56 | 6 | 83 |
| NMP | 1.0 | 52.2 | 42.6 | 5.2 | 36 | 8 | 80 |

FIG. 3

MATERIAL OF NANOCOMPOSITES OF THE RESIN AND ITS MANUFACTURING PROCESS

BACKGROUND OF THE INVENTION

1. Field of the Invention

The present invention relates to a material of nanocomposites of the resin and its manufacturing process and, more particularly, to a material of nanocomposites of the resin and its manufacturing process, which can improve the compatibility of the nano-clay to resin.

2. Description of the Related Art

Currently, organic/inorganic polymer composite materials under a nanoscale regime are one of the most significant materials and, thus, have been widely investigated and developed. Such composite materials are dual-phased, wherein at least one phase is dispersed under a nanoscale regime. Accordingly, compatibility between the two phases, for example, clay and polymers, is always essential for the nanoscale dispersion.

Epoxy resin has good adhesive performance, mechanical characteristic such as tensile strength and impact strength, insulation characteristic and machinability. Therefore, it has been commonly used for composite material, electronic material, and electrical insulation material.

Recently, with fast development of various electronic digital products and photoelectric elements, epoxy resin having properties, such as translucent, high hardness, high gas barrier, high heat-resistant, and low size change, is facing higher and higher challenge. With nano-material technology development, epoxy resin organic-inorganic hybrid nanocomposites, formed by combining nano-material and epoxy resin, can have improved high hardness, high gas barrier, high heat-resistant, and low size change for traditional epoxy resin and can keep good mechanical characteristic and machinability from epoxy resin material.

However, in prior art technology of manufacturing organic-inorganic hybrid nanocomposites, the inappropriateness of organic high polymer synthetic reaction conditions usually cause extreme limitations. As an example, original water-based, then modified, clay still has poor compatibility with an oil-base high polymer dispersed system, which causes the clay to stack and be unable to disperse in the oil-based resolution.

Therefore, it is desirable to provide a material of nanocomposites of the resin and its manufacturing process, which can improve the compatibility of the nano-clay to resin to mitigate and/or obviate the aforementioned problems.

SUMMARY OF THE INVENTION

A main objective of the present invention is to provide a material of nanocomposites of the resin and its manufacturing process, which can improve the compatibility of the nano-clay to resin.

Another objective of the present invention is to provide a material of nanocomposites of the resin of the present invention having properties as translucent, high hardness, high gas barrier, high heat-resistant, and low size change (coefficient of thermal expansion, CTE).

In order to achieve the objectives, the present invention discloses a material of nanocomposites of the resin and its manufacturing process. The manufacturing process comprises the steps of providing a nano-clay platelets liquid; adding a modification agent into the nano-clay platelets liquid, then stirring in a first time in a first temperature for making a cake product; taking the cake product heated in a second temperature, then crumbling the cake product for making a first powder; moving the water out of the first powder for making a second powder; adding a resin into the second powder, then stirring and baking for making the material of nanocomposites of the resin.

The present invention also discloses a material of nanocomposites of the resin having a plurality of nano-clay platelets and resin and having the plurality of nano-clay platelets dispersed in the resin.

In one embodiment of the present invention, the nano-clay platelets have inorganic layered silicate clay, and the resin is epoxy resin.

Other objectives, advantages, and novel features of the invention will become more apparent from the following detailed description when taken in conjunction with the accompanying drawings.

BRIEF DESCRIPTION OF THE DRAWINGS

FIG. 3 is an experiment data figure of the method of manufacturing material of nanocomposites of the resin according to the present invention.

DETAILED DESCRIPTION OF THE PREFERRED EMBODIMENT

Figure 1:
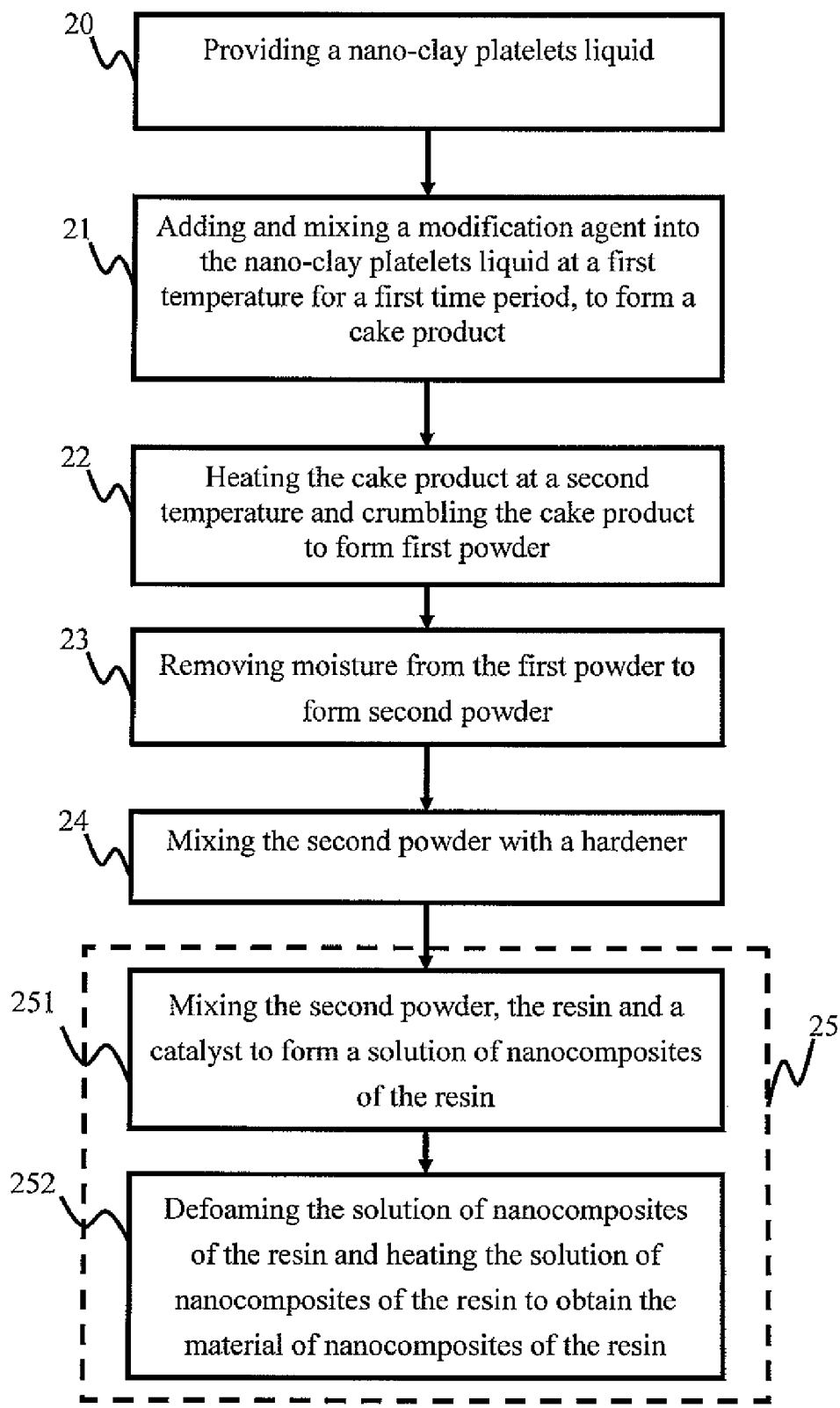
FIG. 1 is a flow chart of a method of manufacturing material of nanocomposites of the resin according to the present invention.

Please refer to FIG. 1. FIG. 1 is a flow chart of a method of manufacturing material of nanocomposites of the resin according to the present invention.

As shown in FIG. 1, the manufacturing method of the material of nanocomposites of the resin comprises:

Step 20: providing a nano-clay platelets liquid. In one embodiment of the present invention, the nano-clay platelets liquid in step 20 is formed by at least one nano-clay platelet, and the nano-clay platelet comprises an inorganic layered silicate clay. In one embodiment of the present invention, the inorganic layered silicate clay can be montmorillonite, mica, kaolin clay, vermiculite, K10 montmorillonite, SWN clay or layered double hydroxides (LDH).

Step 21: adding and mixing a modification agent into the nano-clay platelets liquid at a first temperature for a first time period, to form a cake product.

In one embodiment of the present invention, the modification agent in step 21 is anhydride or its derivates. For example, the modification agent can be methyl hexahydrophthalic anhydride (MHHPA), maleic anhydride, (HA), polystyrene-co-maleic anhydride, (SMA) or imidazole.

In one embodiment of the present invention, the first temperature in step 21 is between 15 to 40° C. and a preferred first temperature is between 25 to 35° C. The first time period length is between 0.5 to 3 hours.

Step 22: heating the cake product at a second temperature and crumbling the cake product to form a first powder.

In one embodiment of the present invention, the second temperature in step 22 is between 60 to 10° C., and the cake product is crumbled by a crushing machine.

Step 23: removing moisture from the first powder to form a second powder.

In one embodiment of the present invention, the method for removing the moisture in step 23 is a freeze drying method.

For example, in the freeze drying method the first powder is placed at temperature between −20 to 40° C. for about 4 to 6 days. Preferably, the first powder is placed at temperature about −40° C. for about 5 days. Therefore, the moisture in the first powder can be completely removed and become the second powder. The second powder has an organic/inorganic rate between 1 to 20 wt % and, preferably, an organic/inorganic rate between 5 to 10 wt %.

Step 24: mixing the second powder with a hardener.

In one embodiment of the present invention, the hardener is carboxylic acid anhydride or its derivates. For example, the hardener can be methyl hexahydrophthalic anhydride (MHHPA), maleic anhydride (HA), polystyrene-co-maleic anhydride (SMA) or imidazole. Any carboxylic acid anhydride or its derivates can be the hardener. The mixing process includes stirring and ultrasonic sieving. For example, after the hardener is added into second powder, a high speed stirrer (1000 rpm) is used for 15 minutes and the ultrasonic sieving machines is used for about 1 hour.

Step 25: adding a resin into the second powder, then stirring and baking to obtain the material of nanocomposites of the resin.

Furthermore, step 25 further comprises:

Step 251: mixing the second powder, the resin and a catalyst to form a solution of nanocomposites of the resin.

Step 252: defoaming the solution of nanocomposites of the resin and heating the solution of nanocomposites of the resin to obtain the material of nanocomposites of the resin.

In one embodiment of the present invention, the resin in step 25 is an epoxy resin, and the catalyst is SA102. In step 251, the mixing process includes stirring and ultrasonic sieving. For example, after the resin and the catalyst is added into the second powder, a high speed stirrer (1000 rpm) is used for 15 minutes, and the ultrasonic sieving machines is used for about 15 minutes. In step 252, the defoaming process is performed by placing the solution of nanocomposites of the resin in a vacuum oven for 15 minutes.

With previous steps, the compatibility of nano-clay for the resin is improved, and the plurality of nano-clay platelets are formed and dispersed evenly in the resin of the material of nanocomposites of the resin. Meanwhile, the material of nanocomposites of the resin of the present invention has properties as translucent, high hardness, high gas barrier, high heat-resistant, and low size change (coefficient of thermal expansion, CTE), which is suitable for electronic resin packaging material.

Furthermore, a comparison example and embodiments of manufacturing method of the material of nanocomposites of the resin of the present invention will be explained.

COMPARISON EXAMPLE

The nano-clay platelets liquid (with solid weigh 4.7 g and an organic/inorganic rate 10 wt %) of the inorganic layered silicate clay (which is montmorillonite) is baked and added with 52.2 g hardener (methyl hexahydrophthalic anhydride, MHHPA) in a 250 ml PE bottle. The high speed stirrer (1000 rpm) stirs the mixture for 15 minutes. However, after stirring and baking, the nano-clay platelets liquid cannot be evenly separated from the hardener (methyl hexahydrophthalic anhydride, MHHPA) and the added resin (epoxy resin) to obtain an even stirred material of nanocomposites of the resin.

Embodiment 1

The nano-clay platelets liquid (with solid weight 2 g and an organic/inorganic rate 10 wt %) of the inorganic layered silicate clay (which is montmorillonite) is added into 0.8 g modification agent (methyl hexahydrophthalic anhydride, MHHPA), stirred by magnetic stones at a first temperature (25 to 35° C.) to become a colloid status, and further stirred for a first time period (0.5 to 3 hours) to become a cake product. Afterward, placing the cake product in the vacuum oven at 80° C. to remove moisture and crumbling the cake product for making a first powder by a crushing machine, the freeze drying method is operated by placing the first powder at −40° C. for 5 days to completely remove the moisture in the first powder to become the second powder. Moreover, the second powder has an inorganic/organic rate 20%.

Next, 4.7 g second powder and 52.2 g hardener (methyl hexahydrophthalic anhydride, MHHPA) is placed in a 250 ml PE bottle. The high speed stirrer (1000 rpm) stirs the mixture for 15 minutes, and the ultrasonic sieving machine is used for about 1 hour to evenly distribute the nano-clay platelets. Furthermore, 42.6 g resin (epoxy resin) and 1 g catalyst (SA102) is added, and the mixture is stirred for 15 minutes, ultrasonic sieved for 15 minutes, and placed in the vacuum oven for defoaming for 15 minutes until there is no foam. Then, the mixture, which is the solution of nanocomposites of the resin, is poured onto an aluminum plate and placed in the oven at 80° C. for 1 hour first and then at 150° C. for 2 hours, to obtain an even material of nanocomposites of the resin.

Embodiment 2

The nano-clay platelets liquid (with solid weight 2 g and an organic/inorganic rate 10 wt %) of the inorganic layered silicate clay (which is mica) is added into 1 g modification agent (maleic anhydride, HA), stirred by magnetic stones at a first temperature (15 to 40° C.) to become a colloid status, and further stirred for a first time period (0.5.about.3 hours) to become a cake product. Afterward, the cake product is placed in the vacuum oven at 80° C. to remove moisture and crumbled for making a first powder by a crushing machine. The freeze drying method is operated by placing the first powder at −20 to −40° C. for 4 to 6 days to completely remove the moisture in the first powder to become the second powder. Moreover, the second powder has an inorganic/organic rate 16.67%.

Next, 4.7 g second powder and 52.2 g hardener (maleic anhydride, HA) in a 250 ml PE bottle is stirred by the high speed stirrer (1000 rpm) for 15 minutes, ultrasonic sieved for 15 minutes, and placed in the vacuum oven for defoaming for 15 minutes until there is no foam. Then, the mixture, which is the solution of nanocomposites of the resin, is poured onto an aluminum plate and placed in the oven at 80° C. for 1 hour first and then at 150° C. for 2 hours, to obtain an even material of nanocomposites of the resin.

Embodiment 3

The nano-clay platelets liquid (with solid weight 2 g and an organic/inorganic rate 10 wt %) of the inorganic layered silicate clay (which is montmorillonite) is added into 2 g modification agent (polystyrene-co-maleic anhydride, SM) stirred by magnetic stones at a first temperature (25 to 35° C.) to become a colloid status, and further stirred for a first time period (0.5 to 3 hours) to become a cake product. Afterward, placing the cake product is placed in the vacuum oven at 80° C. to remove moisture and is crumbled for making a first powder by a crushing machine. The freeze drying method is operated by placing the first powder at −40° C. for 5 days to completely remove the moisture in the first powder to become the second powder. Moreover, the second powder has an inorganic/organic rate 4.77%.

Next, 4.7 g second powder and 52.2 g hardener (polystyrene-co-maleic anhydride, SMA) in a 250 ml PE bottle is stirred by the high speed stirrer (1000 rpm) for 15 minutes, and the ultrasonic sieving machine is used for about 1 hour to evenly distribute the nano-clay platelets. Furthermore, 42.6 g resin (epoxy resin) and 1 g catalyst (SA102) is added and stirred for 15 minutes, ultrasonic sieved for 15 minutes, and placed in the vacuum oven for defoaming for 15 minutes until there is no foam. Then, the mixture, which is the solution of nanocomposites of the resin, is poured onto an aluminum plate and placed in the oven at 80° C. for 1 hour first and then at 150° C. for 2 hours, to obtain an even material of nanocomposites of the resin.

Embodiment 4

The nano-clay platelets liquid (with solid weight 2 g and an organic/inorganic rate 10 wt %) of the inorganic layered silicate clay (which is montmorillonite) is added into 2 g modification agent (imidazole), stirred by magnetic stones at a first temperature (25 to 35° C.) to become a colloid status, and further stirred for a first time period (0.5 to 3 hours) to become a cake product. Afterward, the cake product is placed in the vacuum oven at 80° C. to remove moisture and is crumbled for making a first powder by a crushing machine. The freeze drying method is operated by placing the first powder at −40° C. for 5 days to completely remove the moisture in the first powder to become the second powder. Moreover, the second powder has an inorganic/organic rate 9.01%.

Next, 4.7 g second powder and 52.2 g hardener (imidazole) in a 250 ml PE bottle is stirred by the high speed stirrer (1000 rpm) for 15 minutes, and the ultrasonic sieving machine is used for about 1 hour to evenly distribute the nano-clay platelets. Furthermore, 42.6 g resin (epoxy resin) and 1 g catalyst (SA102) is added and stirred for 15 minutes, ultrasonic sieved for 15 minutes, and placed in the vacuum oven for defoaming for 15 minutes until there is no foam. Then, the mixture, which is the solution of nanocomposites of the resin, is poured onto an aluminum plate and placed in the oven at 80° C. for 1 hour first and then at 150° C. for 2 hours, to obtain an even material of nanocomposites of the resin.

Embodiment 5

The nano-clay platelets liquid (with solid weight 1.8 g and an organic/inorganic rate 10 wt %) of the inorganic layered silicate clay (which is montmorillonite) is added into 2 g modification agent (maleic anhydride, HA), stirred by magnetic stones at a first temperature (25 to 35° C.) to become a colloid status, and further stirred for a first time period (0.5 to 3 hours) to become a cake product. Afterward, the cake product is placed in the vacuum oven at 80° C. to remove moisture and is crumbled for making a first powder by a crushing machine. The freeze drying method is operated by placing the first powder at −40° C. for 5 days to completely remove the moisture in the first powder to become the second powder. Moreover, the second powder has an inorganic/organic rate 7.83%.

Next, 4.7 g second powder and 52.2 g hardener (maleic anhydride, HA) in a 250 ml PE bottle is stirred by the high speed stirrer (1000 rpm) for 15 minutes, and the ultrasonic sieving machine is used for about 1 hour to evenly distribute the nano-clay platelets. Furthermore, 42.6 g resin (epoxy resin) and 1 g catalyst (SA102) is added and stirred for 15 minutes, ultrasonic sieved for 15 minutes, and placed in the vacuum oven for defoaming for 15 minutes until there is no foam. Then, the mixture, which is the solution of nanocomposites of the resin, is poured onto an aluminum plate and placed in the oven at 80° C. for 1 hour first and then at 150° C. for 2 hours, to obtain an even material of nanocomposites of the resin.

Embodiment 6

The nano-clay platelets liquid (with solid weight 0.6 g and an organic/inorganic rate 10 wt %) of the inorganic layered silicate clay (which is montmorillonite) is added into 2 g modification agent (methyl hexahydrophthalic anhydride, MHHPA), stirred by magnetic stones at a first temperature (25 to 35° C.) to become a colloid status, and further stirred for a first time period (0.5 to 3 hours) to become a cake product. Afterward, the cake product is placed in the vacuum oven at 80° C. to remove moisture and is crumbled for making a first powder by a crushing machine. The freeze drying method is operated by placing the first powder at −40° C. for 5 days to completely remove the moisture in the first powder to become the second powder. Moreover, the second powder has an inorganic/organic rate 2.91%.

Next, 4.7 g second powder and 52.2 g hardener (methyl hexahydrophthalic anhydride, MHHPA) in a 250 ml PE bottle is stirred by the high speed stirrer (1000 rpm) for 15 minutes, and the ultrasonic sieving machine is used for about 1 hour to evenly distribute the nano-clay platelets. Furthermore, 42.6 g resin (epoxy resin) and 1 g catalyst (SA102) is added and stirred for 15 minutes, ultrasonic sieved for 15 minutes, and placed in the vacuum oven for defoaming for 15 minutes until there is no foam. Then, the mixture, which is the solution of nanocomposites of the resin, is poured onto an aluminum plate and placed in the oven at 80° C. for 1 hour first and then at 150° C. for 2 hours, to obtain an even material of nanocomposites of the resin.

Figure 2:
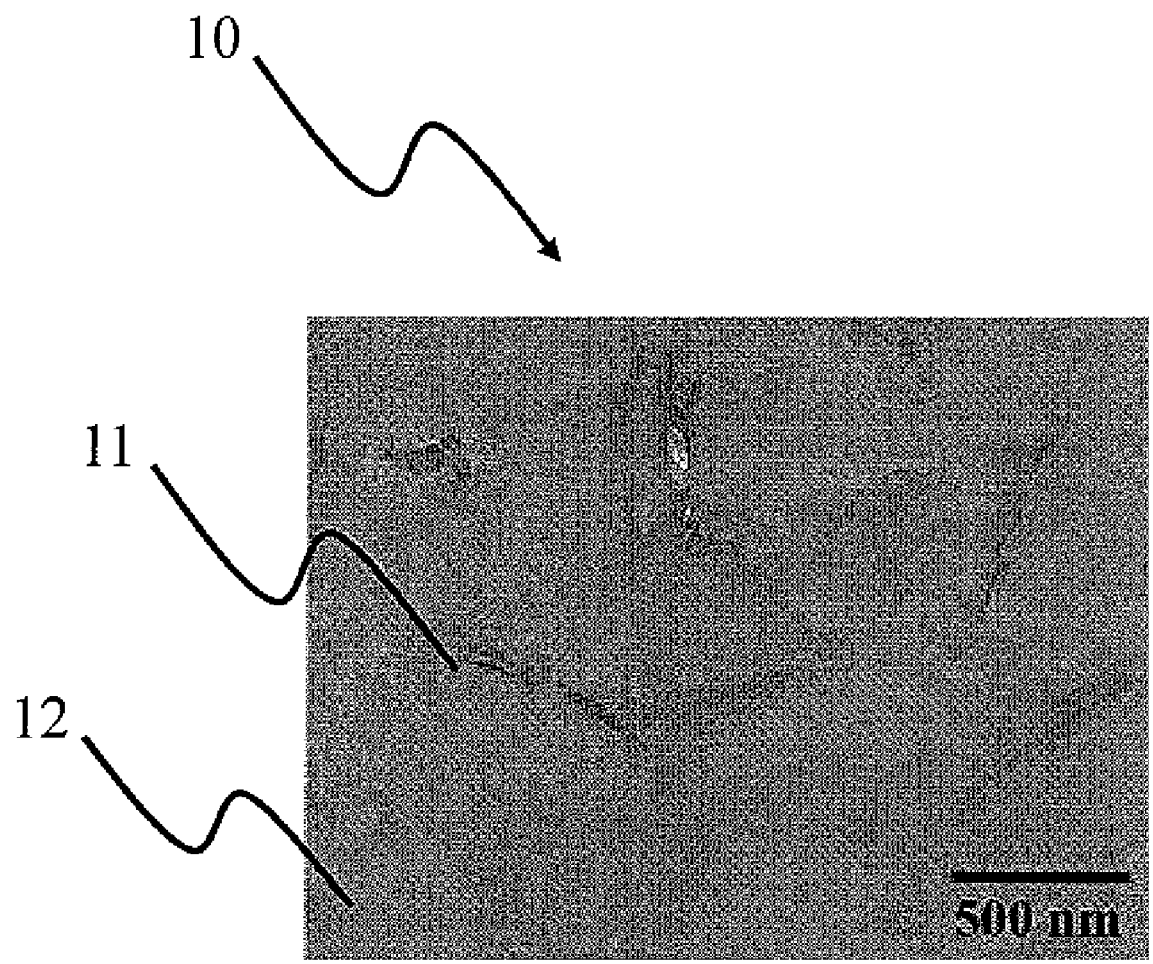
FIG. 2 shows a TEM photo of an embodiment of the material of nanocomposites of the resin according to the present invention.

Please refer to FIG. 2. FIG. 2 shows a TEM photo of an embodiment of the material of nanocomposites of the resin according to the present invention.

As shown in FIG. 2, a material of nanocomposites of the resin 10 is made by the method of manufacturing the material of nanocomposites of the resin of the present invention. The material of nanocomposites of the resin 10 comprises a plurality of nano-clay platelets 11 and a resin 12, and the plurality of nano-clay platelets 11 are evenly dispersed in the resin 12. Furthermore, the actual size of the nano-clay platelets 11 is between $50 \times 50 \times 0.5$ nm$^3$ to $1500 \times 1500 \times 1.5$ nm$^3$.

Please refer to FIG. 3. FIG. 3 is an experiment data figure of the method of manufacturing material of nanocomposites of the resin according to the present invention.

As shown in FIG. 3, NSP indicates the inorganic layered silicate clay is montmorillonite nano-clay platelets, and NMP indicates the inorganic layered silicate clay is mica nano-clay platelets. NSP 105 indicates inorganic layered silicate clay is montmorillonite second powder, and NMP105 indicates the inorganic layered silicate clay is mica second powder. Moreover, CTE is coefficient of thermal expansion.

FIG. 3 shows that by adding the nano-clay platelets into the material of nanocomposites of the resin, the hardness of the material is increased from original 4H to 7 to 8 H. Therefore, adding the nano-clay platelets can increase the mechanical characteristic. For low dimensional change performance test, as shown in FIG. 3, the material of nanocomposites of the resin having the added 0.5 wt % nano-clay platelets has a CTE reduced from original 82 μm/m ° C. down to 36 μm/m ° C.

Therefore, the material of nanocomposites of the resin of the present invention has properties as translucent, high hardness, high gas barrier, high heat-resistant, and low size change (coefficient of thermal expansion, CTE), which is suitable for electronic resin packaging material.

Although the present invention has been explained in relation to its preferred embodiments, it is to be understood that many other possible modifications and variations can be made without departing from the spirit and scope of the invention as hereinafter claimed.

What is claimed is:

1. A manufacturing process of a material of nanocomposites of the resin comprising:
   providing a nano-clay platelets liquid;
   adding a modification agent into the nano-clay platelets liquid and stirring at a first temperature for a first time period, to make a cake product;
   heating the cake product at a second temperature and crumbling the cake product to form first powder;
   removing moisture from the first powder to form a second powder;
   mixing the second powder with a hardener; and
   adding a resin into the second powder, then stirring and baking to obtain the material of nanocomposites of the resin.

2. The manufacturing process of the material of nanocomposites of the resin as claimed in claim 1, further comprising after adding the resin:
   mixing the second powder, the resin and a catalyst to form a solution of nanocomposites of the resin; and
   defoaming and heating the solution of nanocomposites of the resin to obtain the material of nanocomposites of the resin.

3. The manufacturing process of the material of nanocomposites of the resin as claimed in claim 1 further comprising:
   ensuring an organic/inorganic rate of the second powder is substantially between 1 to 20 wt %.

4. The manufacturing process of the material of nanocomposites of the resin as claimed in claim 3 further comprising:
   ensuring an organic/inorganic rate of the second powder is substantially between 5 to 10 wt %.

5. The manufacturing process of the material of nanocomposites of the resin as claimed in claim 1, wherein the resin is an epoxy resin.

6. The manufacturing process of the material of nanocomposites of the resin as claimed in claim 1, wherein the modification agent is carboxylic acid anhydride or derivates thereof.

7. The manufacturing process of the material of nanocomposites of the resin as claimed in claim 1 further comprising:
   providing at least one nano-clay platelets to form the nano-clay platelets liquid, and the nano-clay platelets comprises an inorganic layered silicate clay.

8. The manufacturing process of the material of nanocomposites of the resin as claimed in claim 7, wherein the inorganic layered silicate clay is montmorillonite, mica, kaolin clay, vermiculite, K10 montmorillonite, SWN clay or layered double hydroxides (LDH).

9. The manufacturing process of the material of nanocomposites of the resin as claimed in claim 1, wherein the hardener is carboxylic acid anhydride or derivates thereof.

10. The manufacturing process of the material of nanocomposites of the resin as claimed in claim 1, wherein adding the second powder is in an amount substantially smaller than 5 wt % of the material of nanocomposites of the resin.

11. The manufacturing process of the material of nanocomposites of the resin as claimed in claim 10, wherein adding the second powder is in the amount substantially smaller than 1 wt % of the material of nanocomposites of the resin.

12. The manufacturing process of the material of nanocomposites of the resin as claimed in claim 1, wherein the first temperature is substantially between 15 to 40° C.

13. The manufacturing process of the material of nanocomposites of the resin as claimed in claim 12, wherein the first temperature is substantially between 25 to 35° C.

14. The manufacturing process of the material of nanocomposites of the resin as claimed in claim 1, wherein the first time period is substantially between 0.5 to 3 hours.

15. The manufacturing process of the material of nanocomposites of the resin as claimed in claim 14, wherein the second temperature is substantially between 60 to 100° C.

16. The manufacturing process of the material of nanocomposites of the resin as claimed in claim 1, wherein removing the moisture is freeze drying.

17. The manufacturing process of the material of nanocomposites of the resin as claimed in claim 16, wherein freeze drying comprises: placing the first powder at a temperature of −20 to −40° C. for about 4 to 6 days.

18. The manufacturing process of the material of nanocomposites of the resin as claimed in claim 6, wherein the modification agent is methyl hexahydrophthalic anhydride (MHHPA), maleic anhydride (HA), polystyrene-co-maleic anhydride (SMA) or imidazole.

19. The manufacturing process of the material of nanocomposites of the resin as claimed in claim 9, wherein the hardener is methyl hexahydrophthalic anhydride (MHHPA), maleic anhydride (HA), polystyrene-co-maleic anhydride (SMA) or imidazole.

20. A material of nanocomposites of the resin manufactured by the manufacturing process of the material of nanocomposites of the resin as claimed in claim 1, comprising:
   a plurality of nano-clay platelets; and
   a resin, wherein the plurality of nano-clay platelets are substantially evenly spread in the resin.

21. The material of nanocomposites of the resin as claimed in claim 20, wherein the nano-clay platelets comprises:
   20 to 50 wt % silicon;
   10 to 30 wt % magnesium;
   0 to 10 wt % aluminum;
   1 to 10 wt % sodium;
   0 to 1 wt % iron; and
   1 to 15 wt % fluorine.

22. The material of nanocomposites of the resin as claimed in claim 20, wherein the size of the nano-clay platelets is substantially between $50 \times 50 \times 0.5$ nm$^3$ to $1500 \times 1500 \times 1.5$ nm$^3$.

* * * * *